(12) United States Patent
Smith et al.

(10) Patent No.: US 8,322,091 B2
(45) Date of Patent: Dec. 4, 2012

(54) WINDOW FRAME ASSEMBLY WITH INTEGRAL SEALS

(75) Inventors: Mark L. Smith, Buchanan, MI (US); Roch Tolinski, Howell, MI (US)

(73) Assignee: Atwood Mobile Products, LLC, Elkhart, IN (US)

( * ) Notice: Subject to any disclaimer, the term of this patent is extended or adjusted under 35 U.S.C. 154(b) by 152 days.

(21) Appl. No.: 12/702,908

(22) Filed: Feb. 9, 2010

(65) Prior Publication Data

US 2011/0192091 A1    Aug. 11, 2011

(51) Int. Cl.
E06B 1/26 (2006.01)
E06B 1/30 (2006.01)

(52) U.S. Cl. ..... 52/208; 52/204.54; 52/656.5; 52/656.9; 49/501

(58) Field of Classification Search .......... 52/208, 52/656.5, 656.9, 656.6, 205.54; 296/201, 296/146.15; 49/501; 403/205, 295, 401, 403/403
See application file for complete search history.

(56) References Cited

U.S. PATENT DOCUMENTS

| | | | | |
|---|---|---|---|---|
| 2,717,667 | A * | 9/1955 | Bancroft | 49/503 |
| 3,786,612 | A * | 1/1974 | Baker | 403/295 |
| 4,024,690 | A | 5/1977 | Collins et al. | |
| 4,036,149 | A * | 7/1977 | White | 105/280 |
| 4,164,105 | A * | 8/1979 | Herbst et al. | 52/202 |
| 4,205,486 | A | 6/1980 | Guarnacci | |
| 4,303,289 | A * | 12/1981 | Hardy | 312/348.2 |
| 4,555,869 | A | 12/1985 | Kenkel | |
| 4,833,803 | A * | 5/1989 | Schwartz | 40/783 |
| 4,840,001 | A * | 6/1989 | Kimisawa | 52/208 |
| 4,856,230 | A | 8/1989 | Slocomb | |
| 5,069,849 | A | 12/1991 | Wain | |
| 5,090,836 | A * | 2/1992 | Hwang et al. | 403/295 |
| 5,105,581 | A | 4/1992 | Slocomb, Jr. | |
| 5,148,649 | A * | 9/1992 | Cipriano | 52/656.5 |

(Continued)

FOREIGN PATENT DOCUMENTS

GB    2036912 A    7/1980

(Continued)

*Primary Examiner* — Robert Canfield
(74) *Attorney, Agent, or Firm* — Michael A. Myers; Shumaker, Loop & Kendrick, LLP

(57) ABSTRACT

A plastic window frame assembly is disclosed that includes rigid molded corner sections. Each of the corner sections has opposite ends. A pair of offset tabs extend outward from each of the opposite ends. The corners are molded so as to include integrally formed non-rigid seals. Lineal rail sections are located between the corner sections. Each of the rail sections has channels, one each formed in an exterior and an interior surface of the rail section for receiving, respectively, the offset tabs of the corner sections to locate and to align the corner sections with a rail section. The channels include a glazing channel extending along the length of the rail section for receiving a glass or plastic pane. The tabs are connected to a rail section such that the tabs and a portion of a rail section together define stake holds, each of which proceeds from an exterior surface of the frame and extends therethrough but does not penetrate the interior surface or the tabs of the frame. Thus, the molded corner sections and the lineal rail sections may be assembled around a glass or plastic pane. The lineal rail sections are extruded such that non-rigid seals are integrally formed during their extrusion. The lineal rails can be cut to fit and assembled around the glazing and connected to the corners without adhesive or caulking steps, which dramatically reduces production time and cost to produce a lightweight strong thermoplastic window frame.

2 Claims, 14 Drawing Sheets

U.S. PATENT DOCUMENTS

| | | | |
|---|---|---|---|
| 5,351,459 A * | 10/1994 | Kassl et al. | 52/656.5 |
| 5,456,874 A | 10/1995 | Cordes et al. | |
| 5,485,705 A * | 1/1996 | Guillemet | 52/656.9 |
| 5,547,359 A | 8/1996 | Cordes et al. | |
| 5,580,628 A | 12/1996 | Cordes et al. | |
| 5,723,199 A | 3/1998 | Boot | |
| 5,921,056 A * | 7/1999 | Weiss et al. | 52/745.16 |
| 6,052,957 A * | 4/2000 | Minnich | 52/202 |
| 6,067,760 A * | 5/2000 | Nowell | 52/204.57 |
| 6,082,048 A | 7/2000 | Backes et al. | |
| 6,314,691 B1 * | 11/2001 | Takagi et al. | 52/220.1 |
| 6,365,086 B1 | 4/2002 | Schoonover et al. | |
| 6,393,768 B1 * | 5/2002 | Roche et al. | 49/506 |
| 6,401,428 B1 | 6/2002 | Glover et al. | |
| 6,464,745 B2 * | 10/2002 | Rivera et al. | 55/497 |
| 6,513,854 B2 | 2/2003 | Lagrue et al. | |
| 6,527,278 B1 | 3/2003 | Norris | |
| 6,688,044 B2 | 2/2004 | Farrar et al. | |
| 6,805,514 B2 * | 10/2004 | Buard | 403/402 |
| 6,845,593 B2 * | 1/2005 | Silverman | 52/655.1 |
| 6,871,902 B2 | 3/2005 | Carson et al. | |
| 6,973,953 B2 * | 12/2005 | Winner | 160/381 |
| 6,982,054 B2 | 1/2006 | Reynolds | |
| 7,021,006 B2 | 4/2006 | Farrar et al. | |
| 7,178,282 B2 * | 2/2007 | Houssian | 40/785 |
| 7,571,569 B2 | 8/2009 | Hiramatsu et al. | |
| 7,677,003 B2 * | 3/2010 | Baughn et al. | 52/473 |
| 8,028,489 B1 * | 10/2011 | Lawrence | 52/656.7 |
| 2001/0014250 A1 * | 8/2001 | Plummer et al. | 403/295 |
| 2005/0129460 A1 * | 6/2005 | Medcalf et al. | 403/403 |
| 2005/0160677 A1 * | 7/2005 | Gepfrey et al. | 49/504 |
| 2005/0193680 A1 * | 9/2005 | Wang | 52/656.9 |
| 2008/0034702 A1 * | 2/2008 | Garries et al. | 52/656.2 |
| 2008/0202035 A1 | 8/2008 | Gepfrey et al. | |
| 2008/0219759 A1 * | 9/2008 | Therrien | 403/295 |
| 2012/0131867 A1 * | 5/2012 | Smith | 52/204.1 |

FOREIGN PATENT DOCUMENTS

| | | |
|---|---|---|
| GB | 2 150 182 A | 6/1985 |
| WO | 0238967 A3 | 5/2002 |

\* cited by examiner

WINDOW FRAME ASSEMBLY WITH INTEGRAL SEALS

FIELD OF THE INVENTION

This invention relates to a plastic window frame assembly with integrally formed seals.

BACKGROUND

Window frames with molded plastic corners and lineal rail sections that may be cut to a desired length and joined between corners to produce a frame are commercially available. None, however, includes a means for aligning corners with the straight sections or for connecting them so that the frame can be assembled around the glass or plastic glazing. Prior structures that designers may purport to guide or otherwise locate the lineal section with its corner mandate use of complicated dies, which increases cost of manufacture. The frame is also made heavy as a result because more thermoplastic is used to form the correspondingly complex hollow extrusions. In mobile home and RV applications, however, it's desirable that weight be minimized for efficient travel.

None of the molded corners or lineal sections heretofore available provides integrally formed seals that may be extruded/molded concurrently with the frame sections. Intuitively, this would offer never before seen advantages such as eliminating labor intensive steps like caulking and installing seals necessary for ensuring a watertight fit around the frame and glazing. Additionally, the abutting surfaces where the corners and rails meet on prior thermoplastic window frames have no seal and thus must likewise be caulked and/or treated. Points where lineal sections and corners meet, therefore, typically appear sloppy and unclean as a result. Prior frames in which corners may be molded and joined to straight lineal pieces require additional steps to manufacture, which amounts to additional capital expenditure and lead time. The production and maintenance of such frames and windows are expensive and time consuming. These problems are multiplied when sliding windows are incorporated into such frames.

Thus, there is a need for a new plastic window frame that may be assembled in a time-efficient and cost-efficient manner, such that the frame can be assembled around the glass without adding seals or caulking thereby lowering the overall costs of window assembly. The present invention meets this need.

SUMMARY OF THE INVENTION

The disadvantages heretofore associated with existing plastic window frames are overcome by Applicants' new plastic window frame assembly. A plastic window frame assembly according to the present invention may include at least one rigid molded corner section with opposite ends. A pair of offset tabs may extend outward from each of the opposite ends. At least one lineal rail section having channels for receiving the offset tabs of the corner section may be provided. The channels in the rail sections help locate and align a corner section with a rail section. The channels may include a glazing channel having a non-rigid seal integrally formed therewith. The glazing channel may extend along the entire length of the rail section for sealing a glass or plastic pane in the glazing channel. Additionally, a connecting means is provided for connecting the offset tabs of the corner section with a rail section once the tabs are fully inserted in the channels.

In one aspect of the invention, the channels that receive the offset tabs may be formed one each in the exterior and the interior surface of the rail section such that the frame assembly is supported on the exterior and the interior where the corner sections and the rail sections come together.

In another aspect, the rigid molded corner section may include a glazing channel formed on an interior surface and having a non-rigid seal integrally formed with the channel and extending along the length of the corner for sealing a glass or plastic pane in the glazing channel, such that the glazing channel and seal of a corner section are longitudinally aligned with the glazing channel and seal of a rail section when the tabs are in the channels.

In another aspect, the molded corners and the rail sections each may include an integrally formed rigid façade with a back. The back of the façades may have a rearward extending non-rigid seal integrally formed with the backs of the façades for sealing between the frame assembly and a building structure.

In yet another aspect of the invention, the molded corner may include an integrally formed rigid façade having a front and a back. A rigid cover tab may be integrally formed with the front of the façade for overlapping and covering the area that may otherwise be visible where the corner sections and the rail sections come together when the tabs are connected to a rail section.

In still another aspect, the ends of the molded corner may include a non-rigid seal integrally formed therewith for sealing between the corner section and the rail section when the sections are brought together.

In still another aspect of the invention, the corner sections and the rail sections each includes a slider channel for receiving a slider glazing such that the slider glazing can be added to the frame assembly and move to and fro within the window frame assembly between an open position and a closed position. The slider glazing may include at least one frame member having a releasable connecting means for releasably connecting the slider glazing to the frame assembly when the slider glazing is in the closed position.

In another aspect, a rigid central lineal section may span between a top and a bottom of the frame assembly. The central lineal section may include a non-rigid seal integrally formed along its length for sealing a space between the slider glazing and the lineal section.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Figure 1:
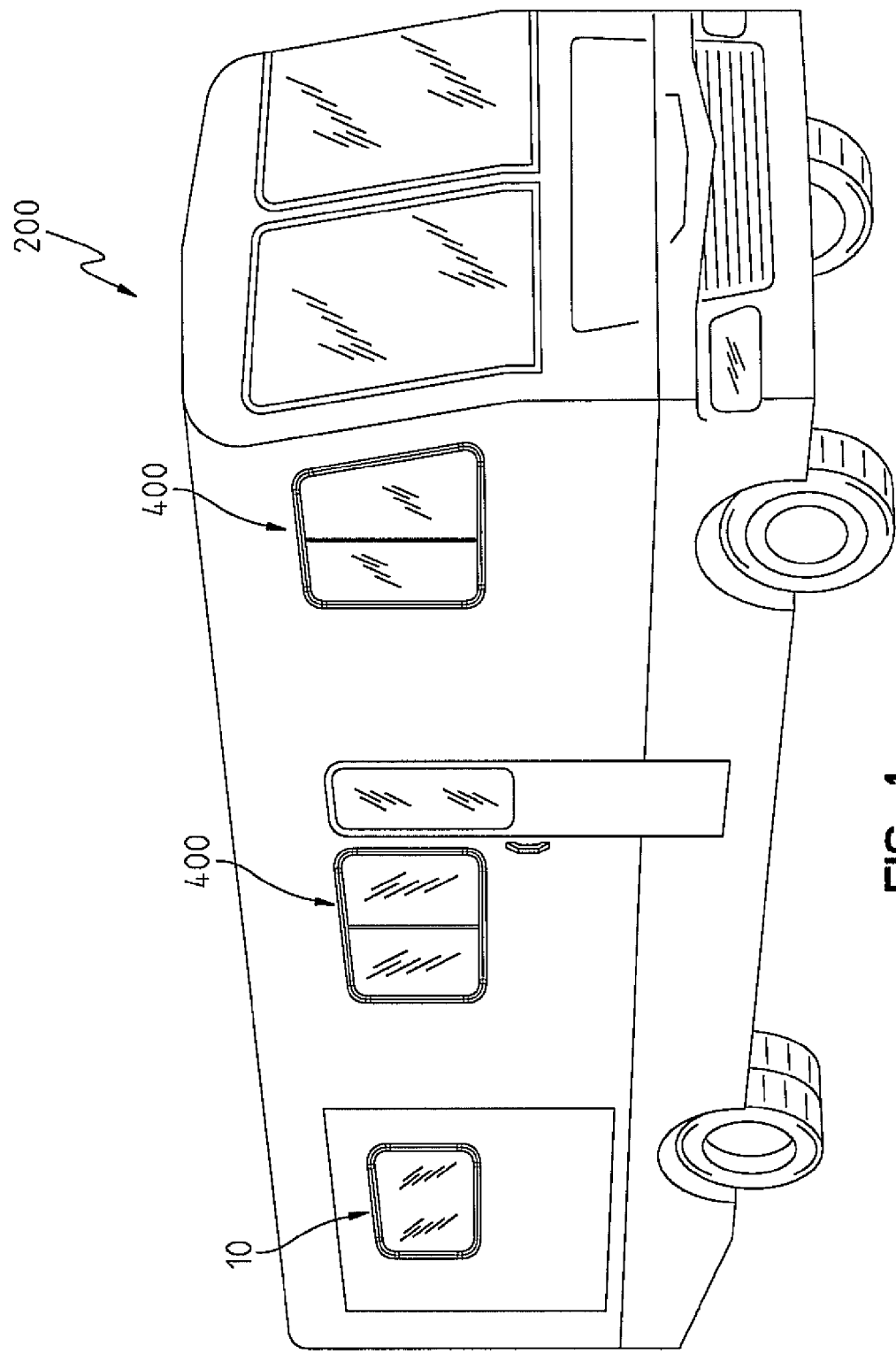
FIG. 1 is a perspective view of a recreational vehicle showing sample embodiments of the window assembly of the invention.
Figure 2:
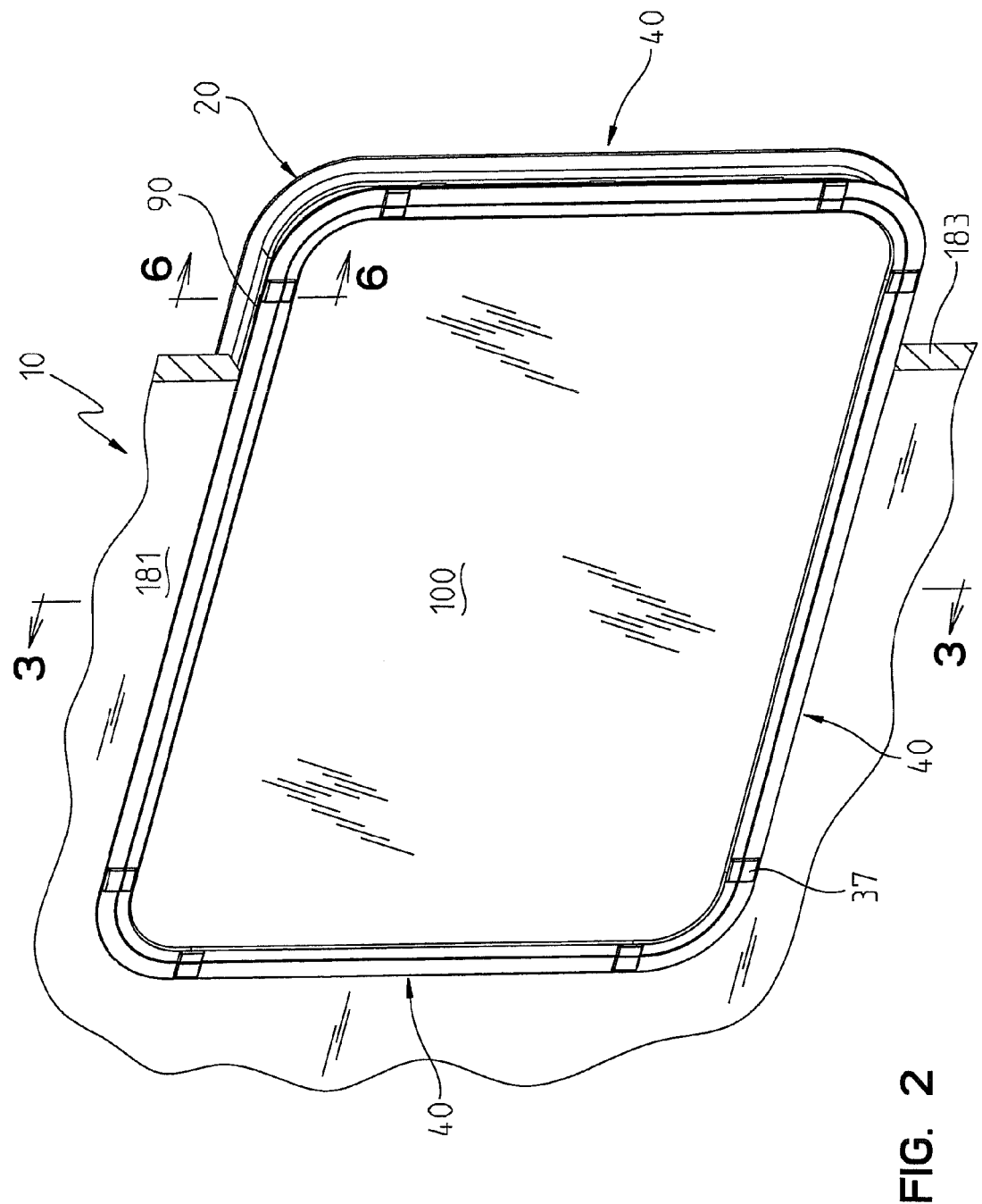
FIG. 2 is a perspective view of an embodiment of the standard window frame assembly shown mounted in the opening of a building structure with the building structure partially cutaway.

FIG. 1 illustrates a recreational vehicle 200, which demonstrates an example of the type of building structure for housing Applicants' new window frame assembly 10. The window frame 10 of the invention is well-suited for all types of building structures where windows are desirable. A non-exclusive list of such dwellings may include, modular homes, mobile homes, RVs, fifth wheels, as well as manufactured houses. The new window design contemplates a base structure assembly 10 to which may be added a central lineal rail 600 spanning between the top and bottom of the frame assembly for accommodating a slidable glazing component 440 and screen enclosure 420 further described below in detail.

Figure 4:
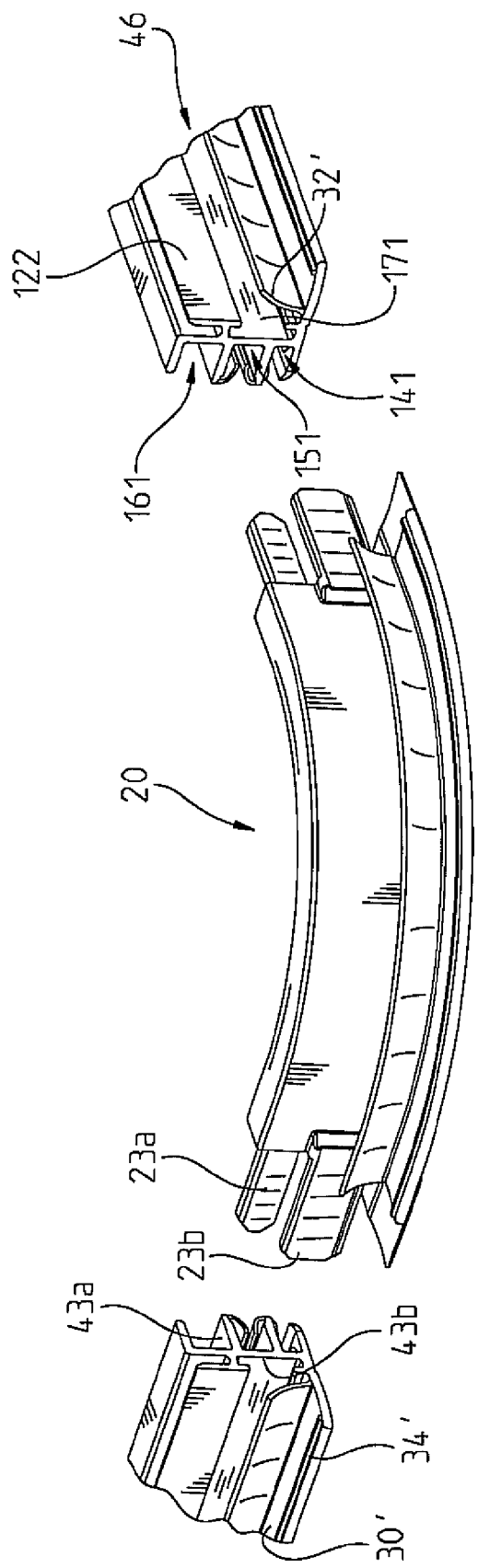
FIG. 4 is a perspective exterior view of an embodiment of the molded corner section and partial cutaways of the lineal rail sections of the invention.
Figure 5:
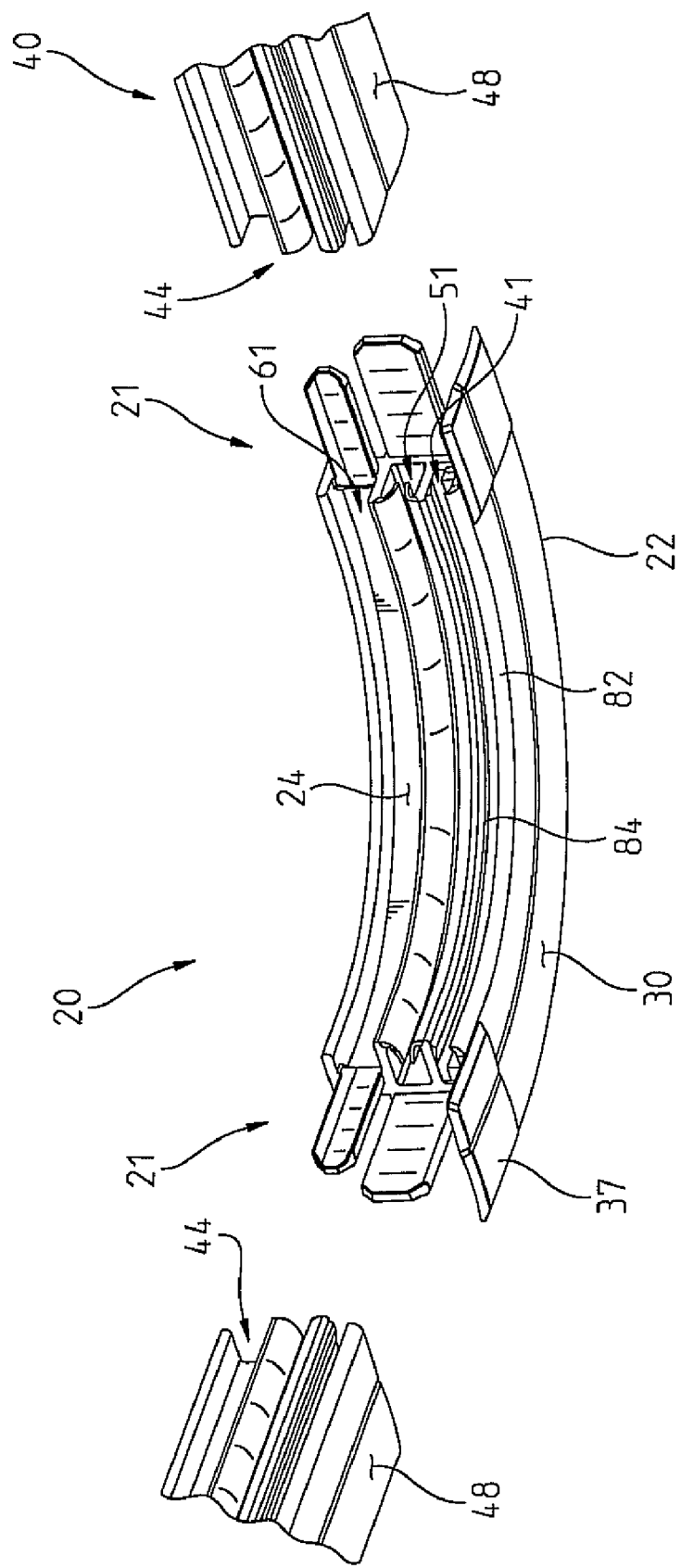
FIG. 5 is a perspective interior view of an embodiment of the molded corner section and partial cutaways of the lineal rail sections of the invention.

An improved plastic window frame 10 is disclosed for conveniently assembling around a glass or plastic glazing 100. The plastic glazing in all applications of the invention may be acrylic or a thermoplastic composite and may be partially tinted so long as such pane is compliant with traffic safety laws. With reference to FIGS. 2-6, the window frame assembly 10 includes rigid molded corner sections 20 with opposite ends 21. Each of the corner sections has an interior surface 24 (FIG. 5) and an exterior surface (FIG. 4). A pair of offset tabs 23 extend outward from each of the opposite ends. The tabs are offset in that one 23a depends from the interior surface and the other 23b depends from the exterior surface of the ends 21 of the corner sections 20 and thus are not coplanar. As shown in FIG. 5, channels 41, 51, 61 with upstanding walls are formed in the interior surface of the corner. Proceeding from the lower channel toward the top channel, the channels include a glazing channel 41, a slider channel 51, and a screen channel 61.

Figure 6:
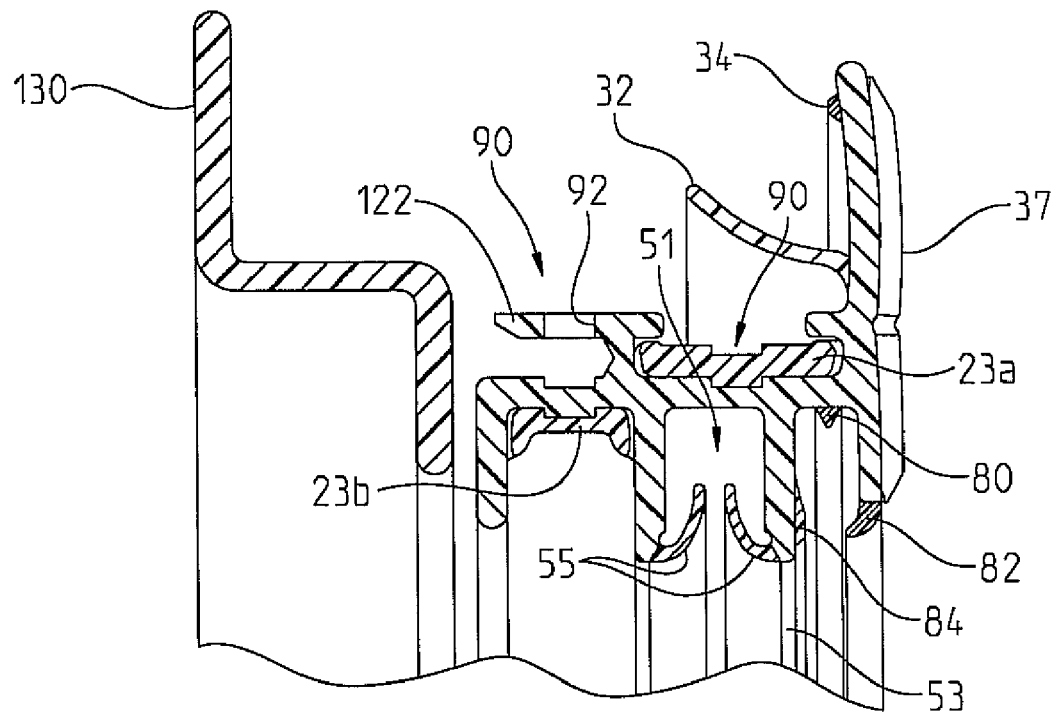
FIG. 6 is a cross-sectional view of the window frame assembly of FIG. 2 taken along lines 6-6 with the building structure and glazing removed.

Referring to FIGS. 5-6, non-rigid seals are integrally formed at the ends of the walls of the glazing channel 41 and extend along the length of the corner section. In an embodiment, the glazing channel seal includes a glazing stop seal 80, a front seal member 82, and a rear seal member 84, as shown in FIG. 6. The edge of the glazing 100, e.g., glass or plastic as previously mentioned, abuts the stop seal 80, and seal members 82, 84 sandwich the window's glazing to produce a water-tight seal. Another non-rigid seal is formed along the length of the walls that define the slider channel 51. In one embodiment, the ends of the walls that define the slider channel each has a non-rigid seal portion 55 hinged to its top end 53.

Figure 3:
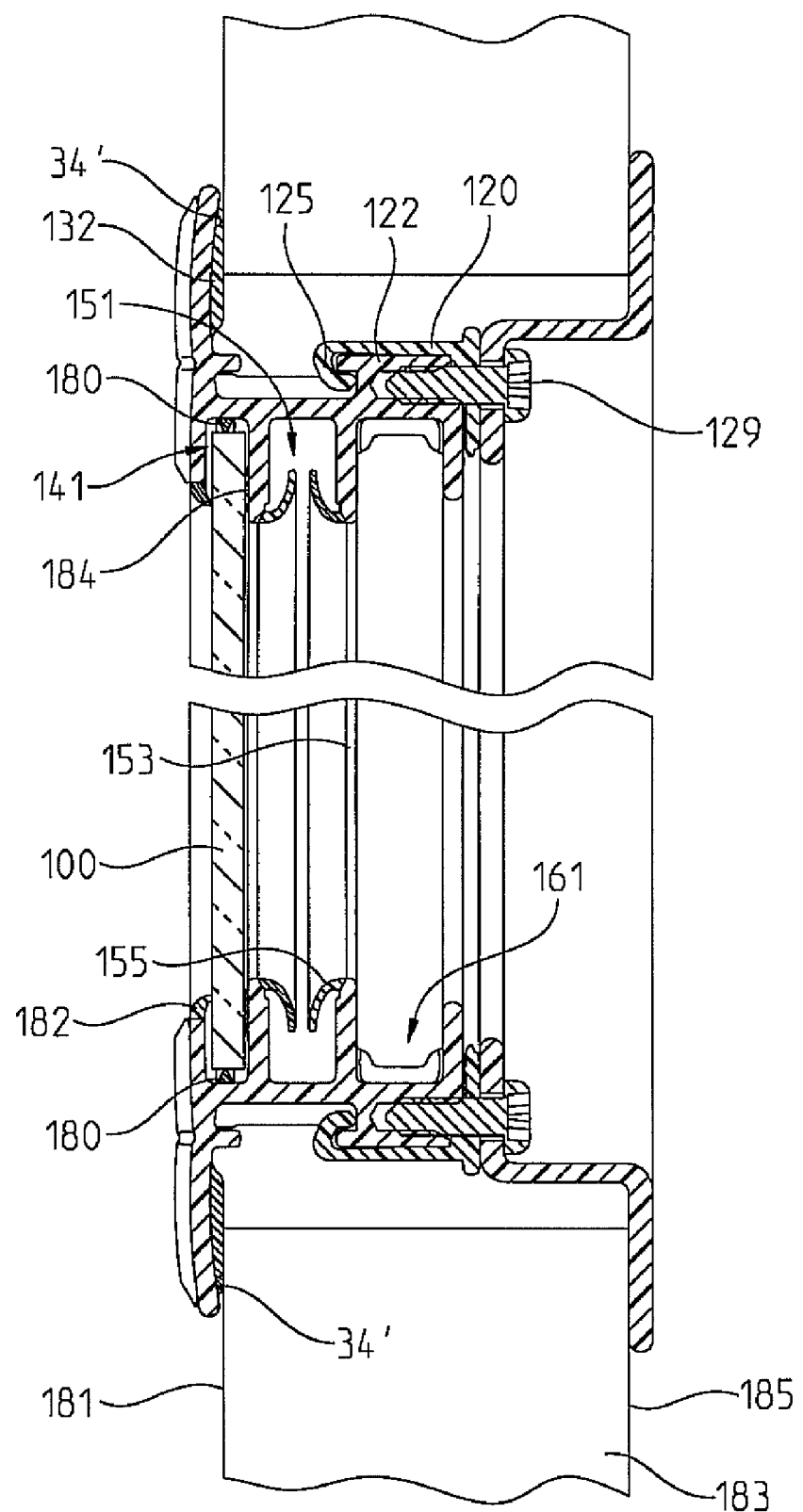
FIG. 3 is a cross-sectional view of the window assembly of FIG. 2 taken along lines 3-3.

Additionally, the back of the façade 30 includes a building structure side seal 32, which extends rearward in a generally arcuate fashion from the back of the façade and a front seal 34 substantially lower in profile in comparison with the side seal for abutting against the front 181 of the building structure 183, as illustrated in FIG. 3. The front of the façade 30 includes a cover tab 37 depending therefrom. In one embodiment, the ends 21 of the corner sections 20 may include non-rigid sealing portions 25 for defining a seal where the lineal sections meet the corner sections, as described below, in order to form a water-tight seal without having to add caulking or other stripping.

Referring to FIGS. 2-6, straight lineal rail sections 40 are located between the corner sections 20. Each rail section 40 includes an interior surface 44 (FIG. 5), an exterior surface 46 (FIG. 4), and a front façade 48. Channels with upstanding walls are also formed in the interior surface of the lineal rail sections for axially aligning with the channels in the interior of the corner sections 20. Hence, there is provided a glazing channel 141, a slider channel 151, and a screen channel 161 (see FIG. 4), which are brought into alignment with channels 41, 51, 61 formed in the interior surface 44 of the corner sections when the window frame 10 is assembled. Tab receiving channels 43 are formed one each in the interior and exterior surfaces 44, 46 (FIGS. 4-5B) of the ends of the rail sections to locate and to align the corner sections 20 with the rail sections 40 when the tabs 23 are fully inserted.

The mouth of the channel 161 serves as the receiving channel 43a for tab 23a corresponding to the interior portion of the lineal section 40, and the mouth of the channel 171 serves as the receiving channel 43b for tab 23b corresponding to the exterior portion 46 of the lineal section 40. The structures mentioned in the preceding sentence are present on both ends of each corner accordingly. The "staggered" arrangement of the tabs 23 provides strength against torsion forces that otherwise may be exerted on the location where the corner and lineal sections come together.

Figure 5A:
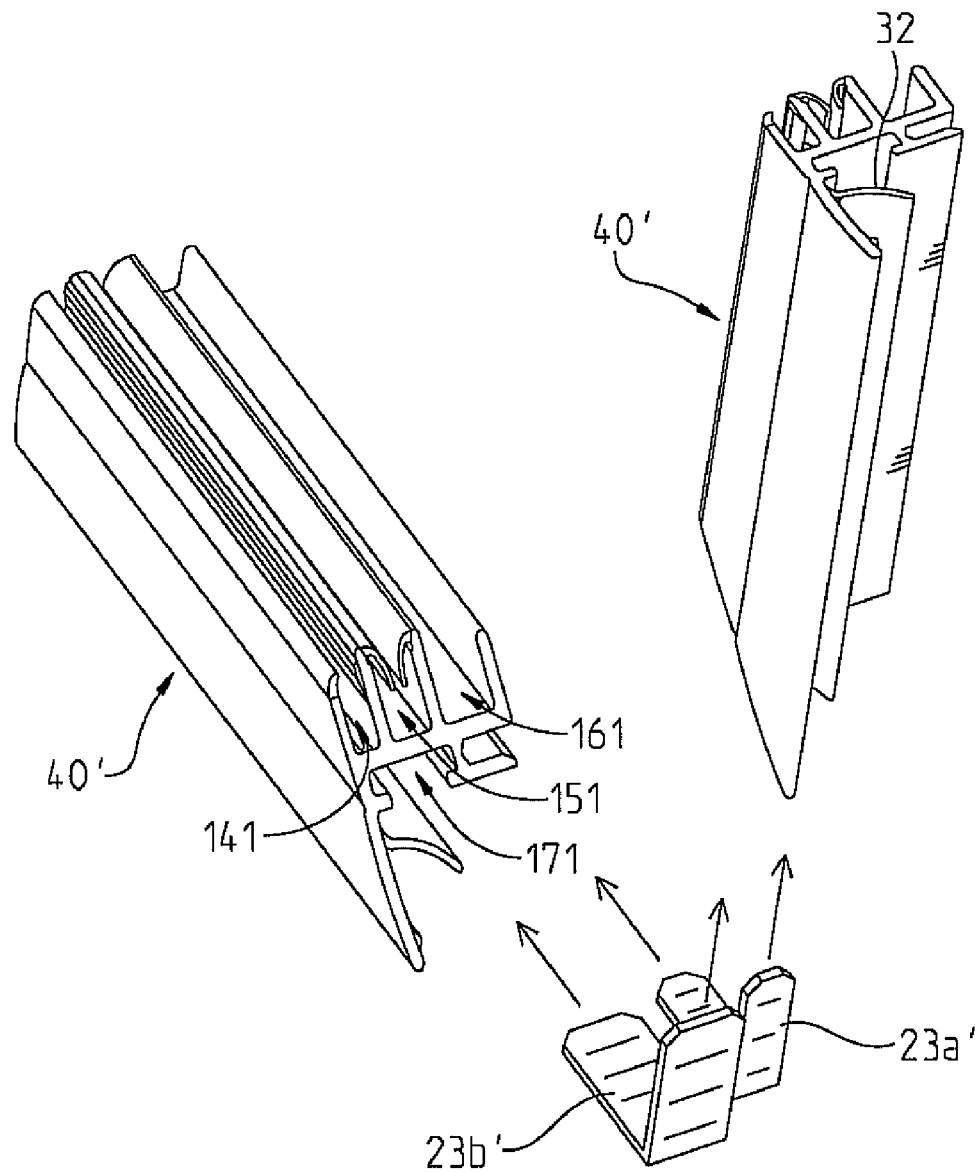
FIG. 5A is an elevated perspective view of an embodiment of a mitered corner of the window assembly of the invention.
Figure 5B:
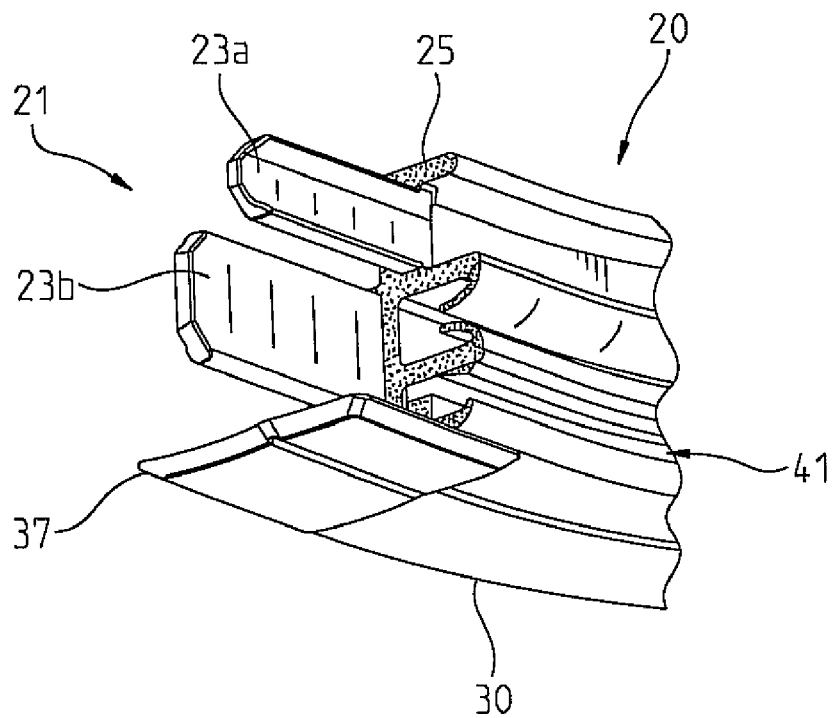
FIG. 5B is a partial cutaway perspective view of another embodiment of the molded corner section showing the cover tab, pair of offset tabs, and the non-rigid seal on its end portion.

In another embodiment, straight lineal rail 40 may be mitered to form rails 40', like the ones shown in FIG. 5A, that may be connected to form a corner. Molded corner tabs 23a', 23b' may be formed such that the offset orientation and thus the strength of a mitered corner, e.g., a ninety degree (90°) or other non-curved corner, may be optionally formed. In that embodiment, the channel 161 of the opposing rails 40' serves as the receiving channel for tab 23a', and channel 171 serves as the receiving channel for tab 23b' in a manner like that previously mentioned above with respect to the embodiment of corner 20 illustrated in FIG. 4

With reference to FIG. 3, similar to the corner section (FIG. 6), a non-rigid seal is integrally formed at the ends of the walls of the glazing channel 141 and extends along the length of the lineal section. In one embodiment, the channel seal includes a glazing stop seal 180, a front seal member 182, and a rear seal member 184. The edge of the glazing 100, e.g., glass or plastic, abuts the stop seal 180, and seal members 182, 184 of the lineal sections sandwich the window's glazing to produce a water-tight seal in a manner similar to the corner section. Another non-rigid seal is formed along the length of the walls that define the slider channel 151 of the lineal sections. In one embodiment, the ends of the walls that define the slider channel each has a non-rigid seal portion 155 hinged to its top end 153, as shown in FIG. 3.

Additionally, the back of the façade 30' of the lineal sections includes a building structure side seal 32', which extends rearward in a generally arcuate fashion from the back of the façade and a front seal 34' substantially lower in profile in comparison with the side seal for abutting against the front 181 of the building structure 183. These seals are similar to their complements integrally formed with the corner sections 20. This seal is suitably resilient such that it follows the contour of the building structure surface 181 and ultimately contacts front seal 34' to seal the frame assembly against the building structure.

As previously mentioned, the seals included with the corner and rail sections 20, 40 are softer and thus of a different durometer than the more rigid bodies of the corner section 20 and rail 40. Preferably, the corner section is injection molded while the lineal rails are extruded and cut-to-fit accordingly, which allows for rapid change to new sizes with minimal tooling. The Applicants have employed different composite thermoplastics, including thermoplastic polyolefin's (TPO) and thermoplastic vulcanizates (TPV) and combinations thereof, which have proven effective in application.

TPO refers to a polymer/filler blend comprising polypropylene, polyethylene, block copolymer polypropylene, rubber, and a reinforcing filler, which may include talc, fiberglass, carbon fiber, wollastonite, and Metal Oxy Sulfate. A nonexclusive listing of rubbers may include ethylene-propylene rubber (EPR), EP-diene rubber (EPDM), ethylene-octene (EO), ethylene-butadiene (EB), and styrene-ethylene-butadiene-styrene (SEBS). A TPO composite for producing the corners and lineal sections 20, 40 as described herein is available from Jyco Sealing Technologies, Ann Arbor, Mich., USA.

Preferably, the corners and lineal sections are formed from a thermoplastic olefin (TPO) and their bodies, excluding the seals, have a hardness of between about 55-65 Shore D. The seals 25, 32, 34, 32', 34', 82, 84, 55, 182, 180, 184, and 155, on the other hand, which are integrally formed with their corresponding sections, whether molded in the case of the corners 20 or extruded with respect to the lineal rails 40, have a hardness of between about 65-70 Shore A.

The present invention is based in part on this dual-durometer character. All of the seals are incorporated into the molded corners 20 and lineal sections 40. There are no separate seals to install. Neither must corners or joints be caulked. Production time and cost for the new window according to the disclosed design is, therefore, substantially reduced. The preferred values of the dual durometers of the invention, however, should not be construed as limiting. Other durometers may be appropriately desirable and availed without undue experimentation and should be considered to fall within the scope of Applicants' innovative frame 10.

Additionally, use of TPO along with the radius geometry embodiment of the corner sections 20 reduces weight while retaining window integrity and strength. The channels 43 that receive the offset tabs 23 are formed one each in the interior and exterior surfaces 44, 46 of the corresponding rail section such that the frame assembly is supported on the exterior and the interior where the corner sections and the rail sections come together. This produces a strong, lightweight window frame assembly that resists torsion forces. The molded plastic radius corners 20 may be connected to the lineal rail sections 40 using snap fit, adhesive, heat sealing, or sonic weld means. Preferably, once the tabs 23 are inserted into their corresponding channel 43, the tabs may be sonic welded to a rail section such that the tabs and a portion of a rail section together define a stake hold 90. The stake hold unique to the present invention may be seen as small dark rectangles shaped in the exterior of the frame shown in FIGS. 2 and 7.

Referring to FIG. 6, however, stake holds 90 proceed from an exterior surface of the frame 10 and extend therethrough (identified by 92 in FIG. 6) but do not penetrate the interior surface of the corner section 20 or the corresponding tab 23b accordingly. In this manner, the molded corner sections 20 and the lineal rail sections 40 may be assembled around a glass or plastic pane 100. The points where the corners and lineal rail sections 20, 40 come together appear clean and presentable since there is no sloppy sealant or caulking used. The novel cover tab 37 of the invention also covers these locations leaving a neat aesthetically pleasing appearance.

Figure 8:
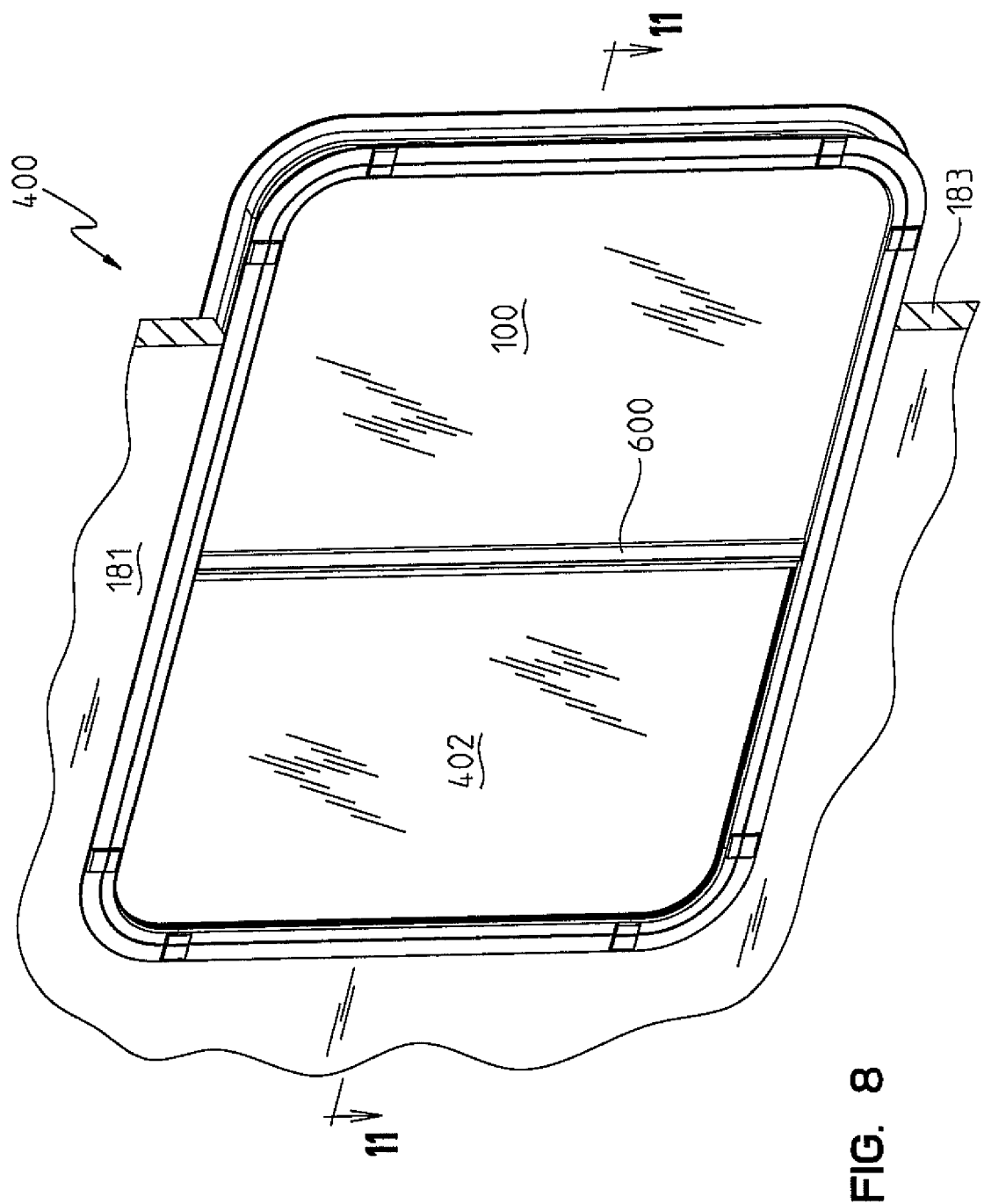
FIG. 8. is a perspective view of another embodiment of the window frame assembly, which includes a slider glazing in its closed position, shown mounted in the opening of a building structure with the building structure partially cutaway.
Figure 9:
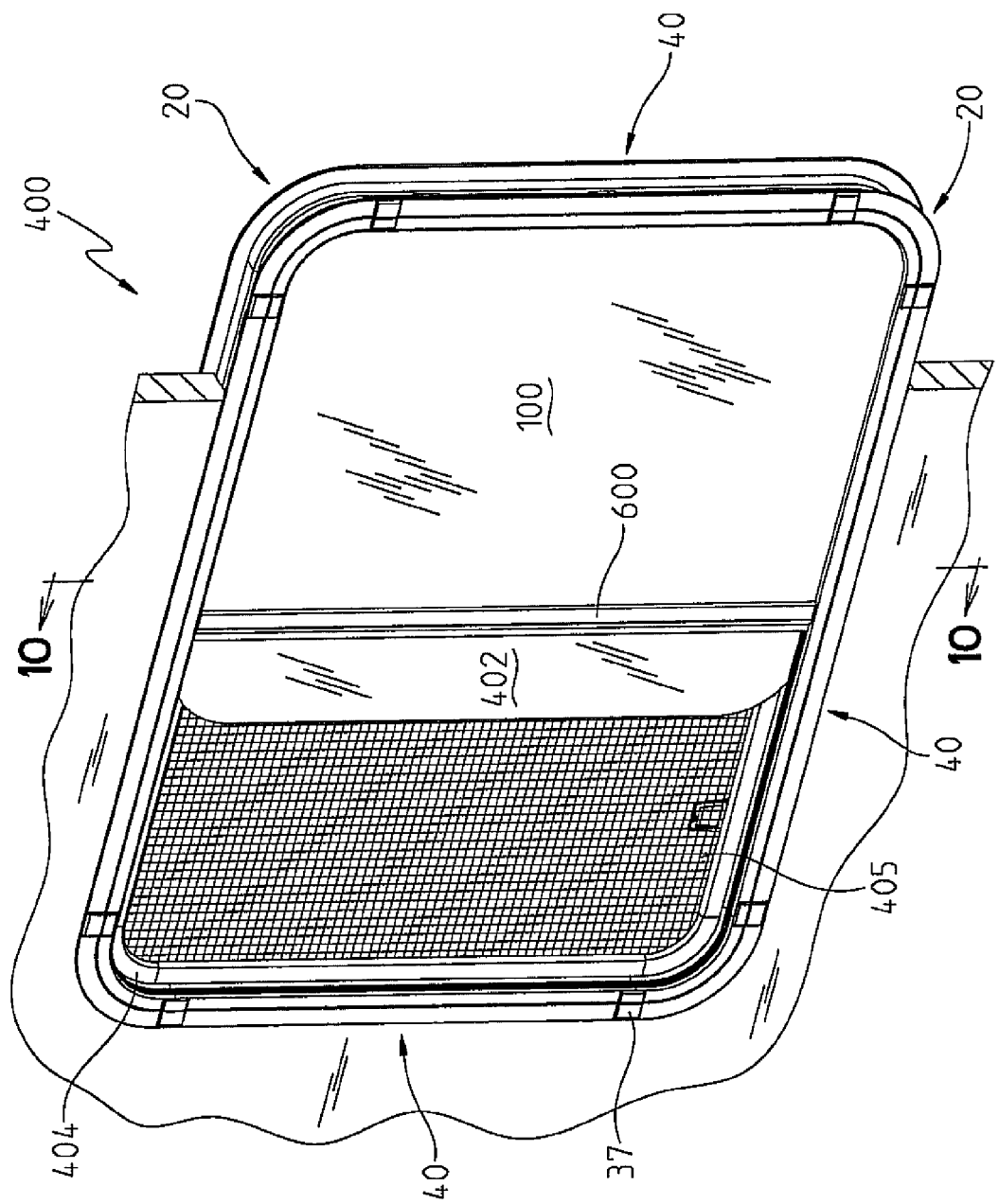
FIG. 9. is a perspective view of the window frame assembly of FIG. 8 illustrating the slider glazing in the open position.
Figure 10:
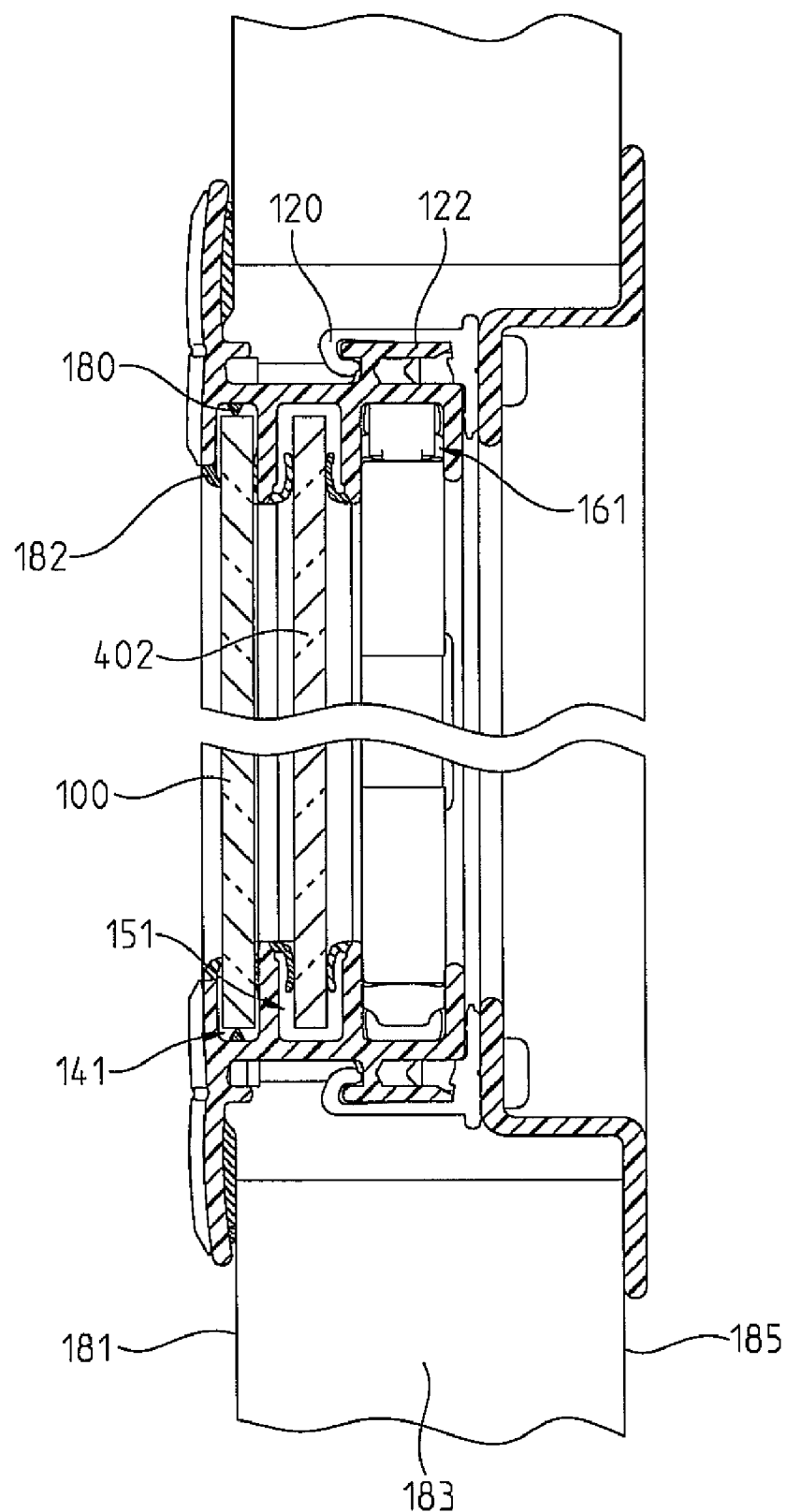
FIG. 10 is a cross-sectional view of the window frame assembly of FIG. 9 taken along lines 10-10.

Referring to FIGS. 8-14, another embodiment of the window frame assembly 400, which includes a slider glazing will be described. FIG. 8 illustrates the window frame assembly embodiment 400, which is the standard window frame assembly 10 of FIG. 2, except that it includes a slider glazing 402 in its closed position. In a manner similar to the embodiment shown in FIG. 2, the slider window frame assembly embodiment 400 is shown mounted in the opening of a building structure 183 in the closed position with the building structure partially cutaway. With reference to FIGS. 8-14, the slider channel 151 receives a glass or plastic slider glazing, or pane 402 such that the slider glazing can move to and fro within the window frame channel 151 of the lineal rails 40 between an open position and a closed position.

Figure 11:
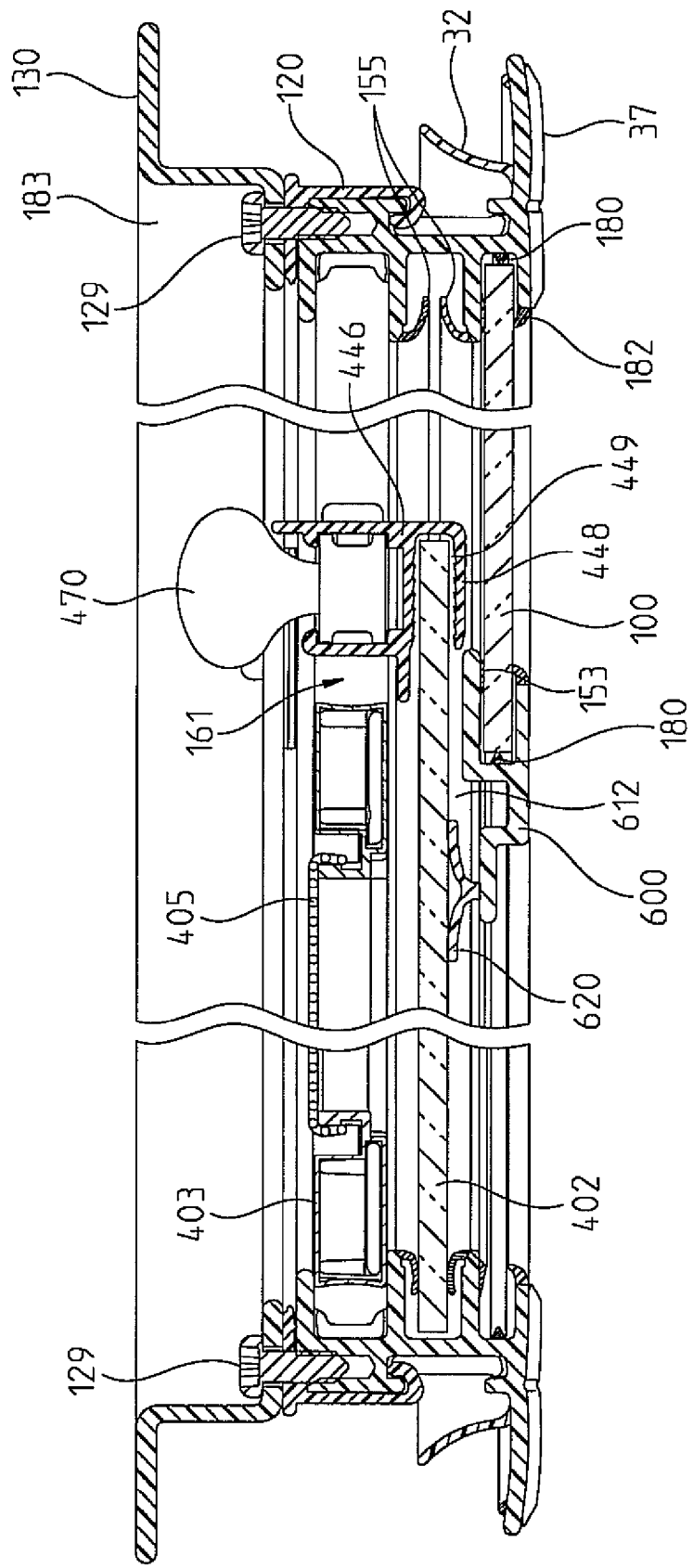
FIG. 11 is a cross-sectional view of the window frame assembly of FIG. 8 taken along lines 11-11.
Figure 12:
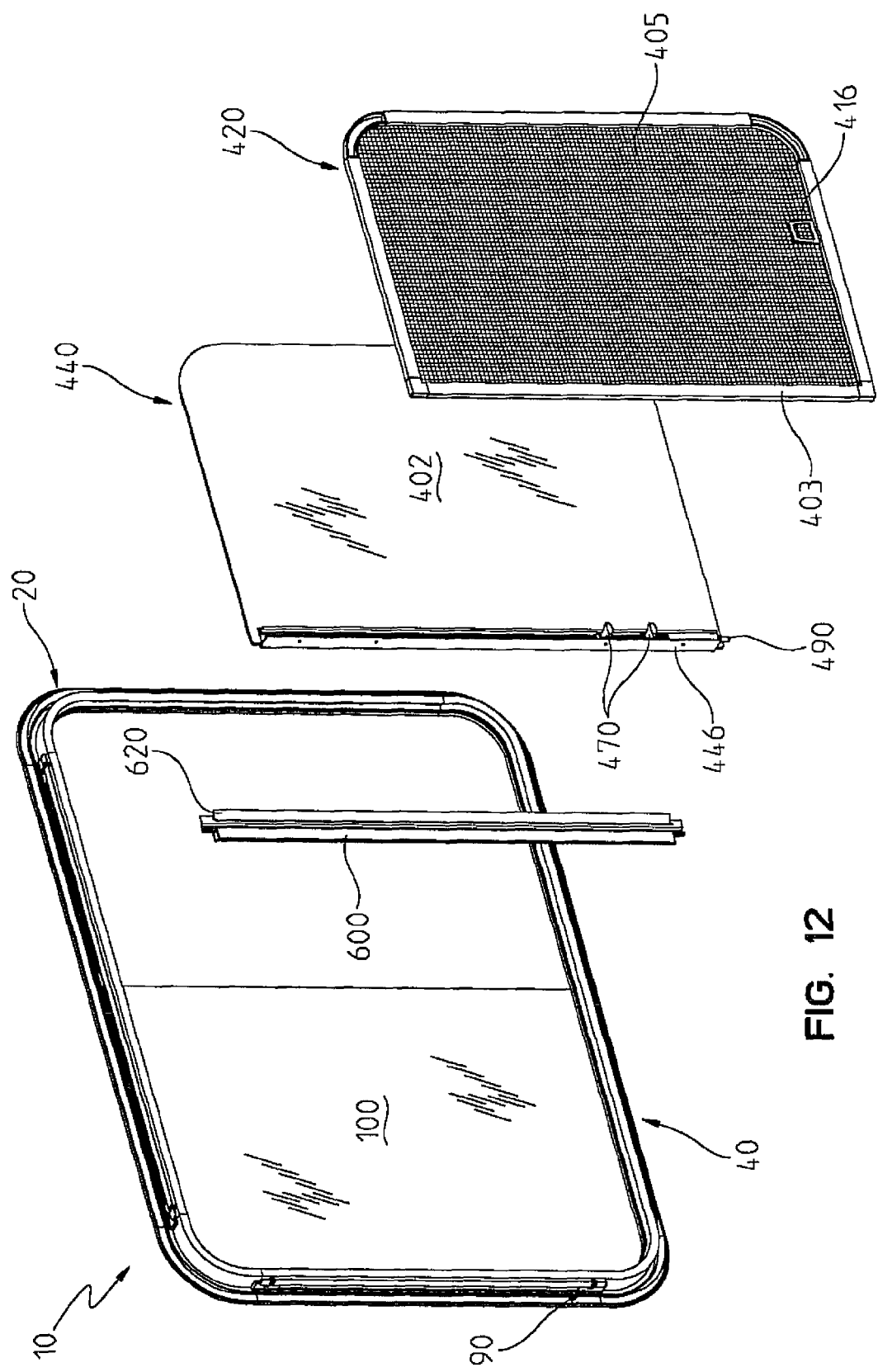
FIG. 12 is an exploded view of the window frame assembly of FIG. 8 removed from the building structure illustrating the screen, the slider glazing, the central lineal rail, and window-frame-with-glazing of the invention.
Figure 13:
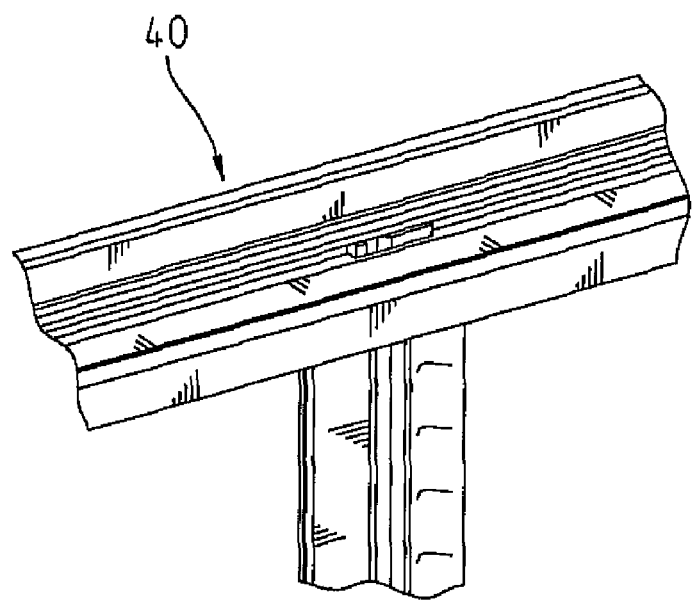
FIG. 13 is a partial cutaway perspective view showing the central lineal rail of the frame assembly connected with a lineal rail section of the invention.
Figure 14:
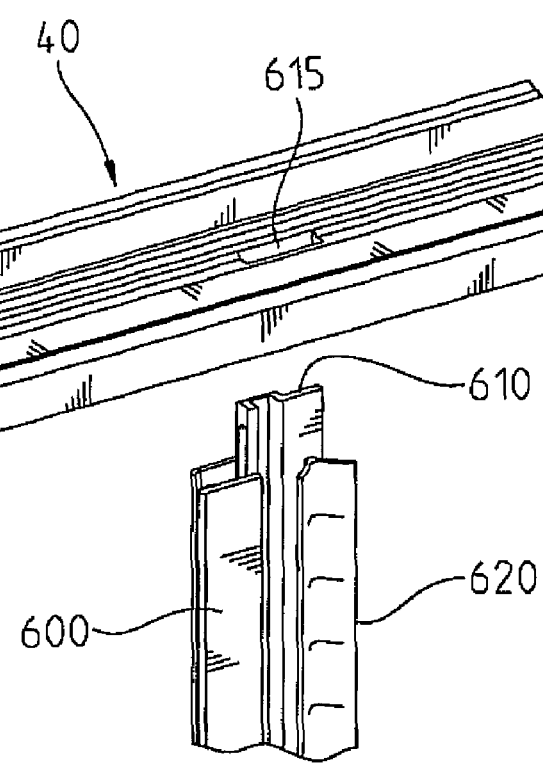
FIG. 14 is a partial cutaway perspective view illustrating the central lineal rail of the frame assembly disconnected from a lineal rail section of the invention.

The slider glazing 402 includes at least one frame member 446 with serrated portions 448 for snugly grasping pane 402, as shown in FIG. 11. Glazing 402 may be fastened to frame member 446 using known snap fit, adhesive, including tape and hot melt, urethane, or other known means. Preferably, the space 449 between the serrated portions 448 and the slider glazing 402 includes adhesive tape to securely connect the glazing and frame member 446. The illustrations, however, have been exaggerated so as to meaningfully show the structural features of the invention and hence, neither the space 449 nor the tape may be apparent. Neither may be the natural settling of the glazing 402 into the channel 151 be intuitive from the drawings and yet Applicant's invention functions in a manner so as to yield the ideal results as herein described.

In one embodiment, the frame member 446 includes a releasable connecting means for releasably connecting the slider glazing 402 to the frame assembly 10 using means known by skilled artisans such as a releasable clip assembly having a pair of tabs 470, one of which includes an axial shaft terminating at a bottom end 490, which may be constantly urged downward by way of a coil spring, for example, relative to the other tab along the longitudinal axis of the frame member 446 such that the end 490 is received in a bore (not shown) formed in the frame 10. Those skilled in the art should recognize that any one of suitable mechanical means may be used to retain the frame member 446 in the channel 151 in a manner so long as the frame member and hence the slider glazing 402 may slide to and fro within the frame assembly 10 within the spirit of the invention as described herein. Intuitively, any one of a known variety of mechanical means may also be employed to retain the screen 405 and frame 403 structure within its screen channel 161. The tab 416 with spring or resilient clip assembly (not shown) for installing and biasing the screen into the slider window frame assembly 400 of the invention is one such example.

Once assembled, the frame 10 and glazing 100, slider 440, or other window structures such as screens 405 and/or frames 403 therefor that are characteristic of the particular embodiment, and which fill the interior opening defined by the standard frame 10 may be installed into an opening of the building structure 183. In addition to all of its seals being incorporated into the molded corners 20 and lineal sections 40, 600, which is new for an RV window, the new window frame assembly 10 uses no fasteners.

Figure 7:
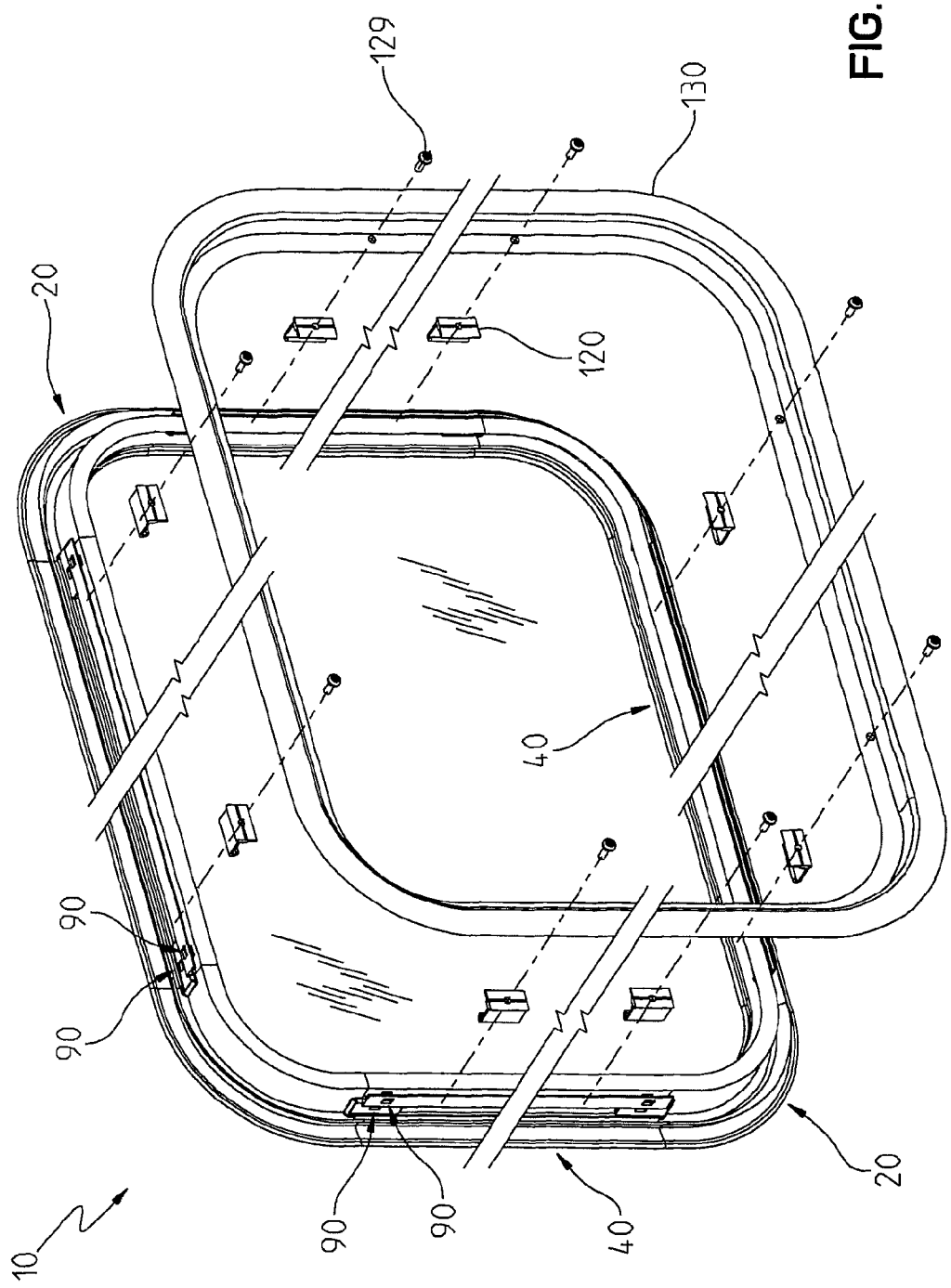
FIG. 7 is an exploded perspective view showing an embodiment of the window assembly of the invention, the fastening clips, and the interior ring for assembling the invention in an opening of a building structure.

Referring to all the Figures, in one embodiment, fastening clips 120 are preferably attached to the clip receiver portion 122 formed on the back side of the frame (FIG. 7). In one embodiment, as shown in FIG. 3, the terminal end 125 of the clip 120 is shaped so that it snap fits onto the clip receiver portion 122 on the back of the frame. Self-threading screws 129 may be used to fasten the frame assembly from the inside fastening ring 130, which abuts against the interior wall 185 of the building structure 183 into the opening pulling the seals 32, 34 against the front 181 of the building structure to form a watertight seal. Optionally, an endless resilient seal member (not shown) may be positioned around the periphery of the opening between the window frame assembly and building structure for additional sealing as desired.

In the case of the slider assembly embodiment 400, the top and bottom ends 610 (only one is shown for simplicity of illustration) of the central lineal member 600 are received by bores 615 formed in lineal rails 40 (FIGS. 13-14), which form the top and bottom of the window frame so that the central lineal member 600 spans across the frame opening. The non-rigid seal 620 integrally formed along the length of the central lineal member 600 seals the space 612 between the slider glazing 402 and the lineal section 600.

Other windows require a secondary and even tertiary seals to be applied at the customer's location before install. In addition to all the aforementioned seals, Applicants' new window has the building structure seals 32, 34 coextruded (or molded in the case of the corner section 20) to the frame for water tight sealing.

It will be understood that the description and drawings presented herein represent an embodiment of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

What is claimed is:

1. A plastic window frame assembly, comprising:
at least one rigid molded corner section with opposite ends, the corner section having an interior surface and an exterior surface;
a pair of offset tabs extending outward from each of the opposite ends, one of the tabs depends from the interior surface of the corner section and the other tab depends from the exterior surface;
at least one lineal rail section having tab receiving channels for receiving the offset tabs of a corner section to align the corner section with a rail section, a glazing channel having a non-rigid seal integrally formed with the glazing channel and extending along the length of said rail section for sealing a glass or plastic pane in the glazing channel; and, connecting means for connecting the tabs to a rail section once the tabs are fully inserted in the channels,
wherein the molded corner includes an integrally formed rigid facade having a front and a back, a rigid cover tab integrally formed with the front of said facade for overlapping and covering where the corner section and the rail section come together when the tabs are connected to a rail section.

2. A plastic window frame assembly, comprising:
at least one rigid molded corner section, said corner section having opposite ends;
a pair of offset tabs extending outward from each of the opposite ends;
lineal rail sections located between said corner sections, each of said rail sections having tab receiving channels one each formed in an exterior and an interior surface of the rail section for receiving the offset tabs of the corner sections to locate and to align said corner sections with said rail section, a glazing channel extending along the length of said rail section for receiving a glass or plastic pane; and,
connecting means for connecting the tabs to a rail section such that the tabs and a portion of a rail section together define a stake hold that proceeds from an exterior surface of the frame and extends therethrough but does not penetrate an interior surface or one of said tabs of the frame, such that the molded corner sections and the lineal rail sections may be assembled around a glass or plastic pane,
wherein the rigid molded corner section includes a glazing channel formed on an interior surface and having a non-rigid seal integrally formed with said glazing channel and extending along the length of each of the corner sections for sealing a glass or plastic pane in said glazing channel.

* * * * *